US007902483B2

(12) United States Patent
Eiterer et al.

(10) Patent No.: US 7,902,483 B2
(45) Date of Patent: Mar. 8, 2011

(54) LASER MACHINING APPARATUS AND LASER MACHINING METHOD

(75) Inventors: Alfons Eiterer, Marktoberdorf (DE); Peter Hildebrand, Pfronten (DE); Michael Kuhl, Füssen (DE); Martin Reisacher, Kempten (DE)

(73) Assignee: Sauer GmbH, Stipshausen (DE)

( * ) Notice: Subject to any disclaimer, the term of this patent is extended or adjusted under 35 U.S.C. 154(b) by 780 days.

(21) Appl. No.: 10/595,733

(22) PCT Filed: Nov. 10, 2004

(86) PCT No.: PCT/EP2004/012723
§ 371 (c)(1), (2), (4) Date: Jun. 5, 2007

(87) PCT Pub. No.: WO2005/044505
PCT Pub. Date: May 19, 2005

(65) Prior Publication Data
US 2007/0289957 A1    Dec. 20, 2007

(30) Foreign Application Priority Data
Nov. 10, 2003    (DE) ................ 103 52 402

(51) Int. Cl.
*B23K 26/36*    (2006.01)
(52) U.S. Cl. ............................ 219/121.7; 219/121.71; 219/121.76; 219/121.85
(58) Field of Classification Search ............ 219/121.61, 219/121.62, 121.76, 121.63–121.72, 121.85; 700/166
See application file for complete search history.

(56) References Cited

U.S. PATENT DOCUMENTS

| | | | | |
|---|---|---|---|---|
| 4,547,038 A | * | 10/1985 | Mori | 359/204.1 |
| 4,789,770 A | * | 12/1988 | Kasner et al. | 219/121.7 |
| 4,839,497 A | * | 6/1989 | Sankar et al. | 219/121.71 |
| 5,054,912 A | * | 10/1991 | Kuchel | 356/5.11 |
| 5,073,687 A | | 12/1991 | Inagawa et al. | |
| 5,093,548 A | | 3/1992 | Schmidt-Hebbel | |
| 5,103,073 A | | 4/1992 | Danilov et al. | |
| 5,126,532 A | * | 6/1992 | Inagawa et al. | 219/121.7 |
| 5,338,645 A | * | 8/1994 | Henderson et al. | 430/311 |
| 6,462,306 B1 | * | 10/2002 | Kitai et al. | 219/121.77 |

(Continued)

FOREIGN PATENT DOCUMENTS

DE    19960797 C1    9/2001

(Continued)

OTHER PUBLICATIONS

Patent Cooperation Treaty, International Search Report, Mar. 17, 2005, 4 pages, European Patent Office.

(Continued)

*Primary Examiner*—Samuel M Heinrich
(74) *Attorney, Agent, or Firm*—Wood, Herron & Evans, LLP

(57) ABSTRACT

Disclosed is a laser machining apparatus comprising a workpiece fixture for fastening a workpiece, a first laser removing device for machining a workpiece using first operating parameters, and a second laser removing device which can machine a workpiece using second operating parameters that are different from the first operating parameters, especially regarding the quality and quantity.

26 Claims, 2 Drawing Sheets

U.S. PATENT DOCUMENTS

| | | | | |
|---|---|---|---|---|
| 6,562,698 B2 * | 5/2003 | Manor | | 438/460 |
| 6,675,057 B2 * | 1/2004 | Liu | | 700/117 |
| 6,677,553 B2 * | 1/2004 | Matsumoto et al. | | 219/121.81 |
| 6,827,988 B2 * | 12/2004 | Krause et al. | | 427/596 |
| 6,881,923 B2 * | 4/2005 | Battaglia | | 219/121.67 |
| 2002/0056291 A1 | 5/2002 | Schultz et al. | | |
| 2002/0134772 A1 | 9/2002 | Troistski | | |
| 2003/0006221 A1 * | 1/2003 | Hong et al. | | 219/121.72 |
| 2005/0067391 A1 * | 3/2005 | Starkston et al. | | 219/121.72 |

FOREIGN PATENT DOCUMENTS

| | | |
|---|---|---|
| DE | 10144008 A1 | 3/2003 |
| DE | 10162379 A1 | 7/2003 |
| EP | WO0018535 | 4/2000 |
| JP | 402220793 A * | 9/1990 |
| JP | 408010970 A * | 1/1996 |

OTHER PUBLICATIONS

European Patent Office, International Preliminary Examination Report, Dated Mar. 1, 2006, 12 pages.

* cited by examiner

LASER MACHINING APPARATUS AND LASER MACHINING METHOD

FIELD OF THE INVENTION

The invention relates to a laser machining apparatus and a laser machining method according to the preambles of the independent claims.

SUMMARY OF THE INVENTION

It is known to machine workpieces using laser beams and in doing so to produce in particular dies or openings and bores, respectively. DE 199 60 797, for example, describes a method for producing an opening in a metal member. In a first step laser drilling is performed using specific laser parameters. In a second step a non-cylindrical funnel is formed, the metal material being sublimated by suitably choosing the laser parameters during laser removal. For this purpose an Nd-YAG laser is used.

WO 00/18535 discloses a method and a device for material removal from a surface of a workpiece. In this case, dies having comparatively complex surfaces are manufactured by a controlled material removal in layers using a guided laser beam.

The disadvantage of the known machines and methods, respectively, is that they cannot perform specific machining steps occurring during manufacture of particular dies or bores or can perform them only under unfavorable operating conditions. For example, the voluminous drilling of a hole may be impossible or may be possible only under disproportionate expenditure of time, or the production of dies with satisfying surfaces may be possible only to an inadequate degree.

It is the object of the invention to provide a laser machining apparatus and a laser machining method which allow the efficient production of complex dies or holes as well.

This object is achieved by the features of the independent claims. Dependent claims are directed to preferred embodiments of the invention.

A laser machining apparatus comprises a workpiece fixture for fastening a workpiece, a first laser removing device for machining a workpiece using first operating parameters, and a second laser removing device for machining the workpiece using second operating parameters different from the first operating parameters, especially regarding the quality and/or quantity.

The laser machining apparatus may comprise different laser sources as well as different optical systems, sensor systems, and controls.

In a laser machining method a workpiece is clamped and then machined using laser light. Without changing the clamping a first machining step is performed through a first laser removing device using first operating parameters and a second machining step through a second laser removing device using second operating parameters is performed, which may be different from the first operating parameters, especially regarding the quality and/or quantity.

The first machining step and thus the first laser removing device may be laser drilling and a laser drill, respectively, and the second machining step and the second laser removing device, respectively, may be a die production for dies having complex surfaces and a device suitable therefor.

BRIEF DESCRIPTION OF THE DRAWINGS

A number of embodiments of the invention are described below with reference to the drawings, wherein.

DETAILED DESCRIPTION OF THE PREFERRED EMBODIMENT

Figure 1:
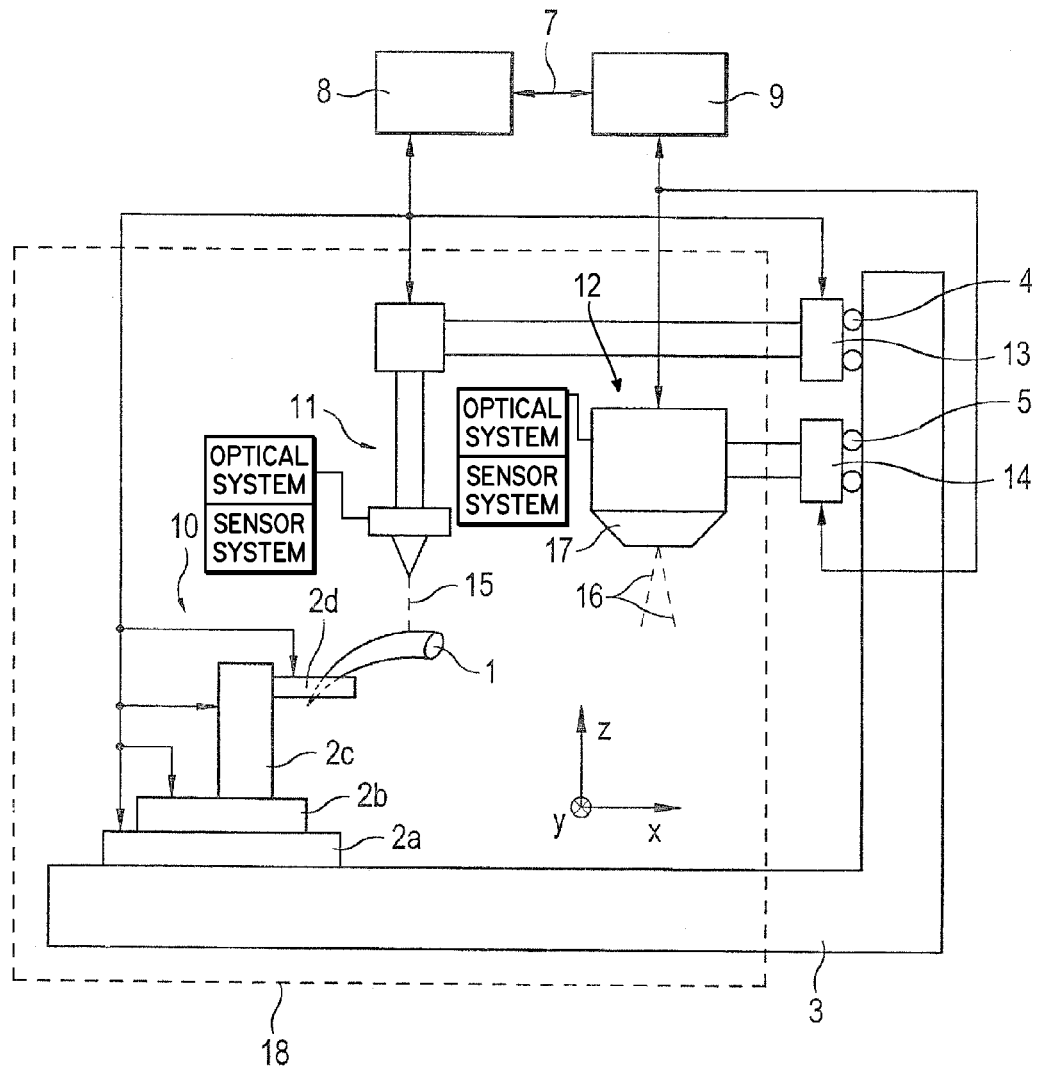
FIG. 1 schematically shows an overall view of the laser machining apparatus.

In the accompanying drawings the same reference numerals denote the same features or components. In FIG. 1, 1 denotes a workpiece, 10 denotes a workpiece fixture, 2a, 2b, 2c and 2d denote translatory and/or rotatory axes of the workpiece fixture 10, 11 denotes a first laser removing device, 12 denotes a second laser removing device, 13 denotes a first laser source, 14 denotes a second laser source, 15 denotes a first laser beam, 16 denotes a second laser beam with its possible deflections, 17 denotes a beam guide to effect the deflections as shown at 16, 18 denotes a machine housing, 8 denotes a first control, 9 denotes a second control, 7 denotes an interface optionally located between the controls, 3 denotes a machine frame and 4 and 5 denote adjustment members through which the laser removing devices may optionally be moved relative to the machine frame, in particular in the z direction. Optionally named coordinate axes shall be as symbolically shown, i.e., the x axis to the right in the plane of projection, the y axis to the back and perpendicularly out of the plane of projection and the z axis to the top in the plane of projection.

The first laser removing device 11 may be a laser drilling device. The second laser removing device 12 may be a device for producing a die, in particular having a complex surface in the workpiece 1, using a laser. They may be operated using operating parameters, laser parameters or working parameters different from each other, which, however, does not principally exclude the partial or temporary equality of certain working parameters in certain application cases. The lasers may also be different from each other. Thus, one of the lasers may be a diode pumped or lamp pumped solid-state laser while the other laser may be a quality-switched solid-state laser. Further differences concerning the parameters for the individual laser removing devices are stated in the following.

One of the laser removing devices, reference numeral 12 in the embodiment as shown, may comprise a laser beam guide 17 guiding the laser beam 16 across the surface of the workpiece and thus effecting removal by material melt-on and vaporization, respectively, at various sites. The left and right limits of the working range of the laser 16 are schematically indicated. The beam guide of the second laser removing device may comprise deflection mirrors, for example two Galvo mirrors acting orthogonally to each other.

Figure 5:
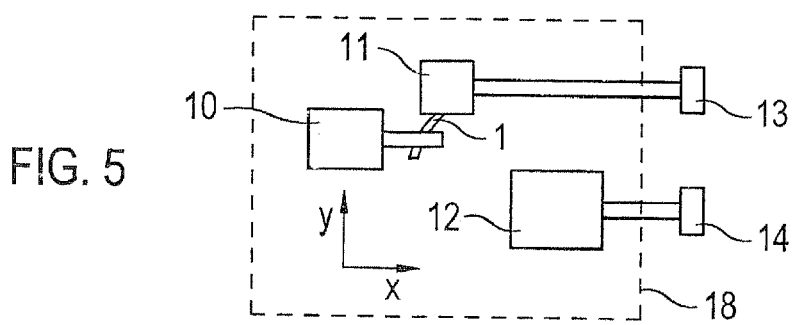

The other (first) laser removing device 11 may be designed such with respect to the workpiece fixture and the workpiece, respectively, that their mutual relative position is slidable, which will be explained below with reference to FIG. 3. The shift of the relative location may be made by shifting the first laser removing device 11 and/or by shifting the workpiece fixture 10. The two laser removing devices 11, 12 may be mounted in a manner offset to each other, as schematically shown in FIG. 5, with respect to one, preferably with respect to two, more preferably with respect to the two horizontal translatory axes of the workpiece fixtures. The two laser removing devices 11, 12 are offset against each other in the x direction as well as in the y direction. In this way they achieve a comparatively large distance in the limited inner space of the machine housing 18 such that collisions are avoided when the workpiece is moved and the degree of freedom is increased when the workpiece is moved.

The laser beam outlet 11a of one of the laser removing devices, in particular of the first laser removing device 11, may be vertically slidable. Particularly, the laser drill may be vertically slidable. In this manner the beam geometry may follow the drilling advancement. If the laser beam outlet is slidable, the associated laser source 13 may be slidable in parallel and in sync thereto. For example, in FIG. 1 the first laser removing device 11 may travel downwards with the advancement of the drilling hole in the workpiece and the associated laser source 13 follows it in sync and in parallel.

The overall machine includes a housing and a cabin 18 which may in part comprise transparent surfaces to be able to observe the progress of the process. The housing serves to retain process gases and process products and optionally serves as an insulation from noise. It also serves to protect the users' body parts, for example, from getting into the course of ray. While the actual laser removing devices 11 and 12 may be provided in the cabin 18 itself, the laser sources 13 and 14 may be attached outside of the cabin 18 and may supply the respective laser light through an opening and optionally via a defined course of ray of the respective laser removing device 11, 12.

The two laser removing devices 11 and 12 may comprise a common control or controls 8 and 9 which are different from each other, and the different controls 8 and 9 may include an interface 7. The control of the laser drilling machine (first laser removing device 11) is able to work at a lower clock frequency than the control of the second laser removing device. The clock frequency of the second control 9 may be ten times or more, preferably 50 times or more, of the clock frequency of the first control 8.

Here, the first control 8 may serve to control the first laser source 13, the first laser removing device 11 as well as the workpiece fixture 10. The second control 9 may serve to control the second laser removing device 12 including the beam guide 17 and the laser source 14. An interface 7 between the two controls 8 and 9 may be provided such that the second control 9 controls indirectly determined machine components, for example particularly axes 2 of the workpiece fixture 10, through the first control 8.

The two removing devices 11, 12 may be independent of each other such that they comprise separate optical systems and focusing means (respectively not shown). The second removing device 12 may comprise a focus location control (not shown) for the second laser beam 16. This focus location control may serve to control the focus location in the z direction.

The respectively present sensor systems (not shown) may also be different from each other. The second laser removing device 12 may comprise a position-sensitive depth sensor system such that numerical triplets consisting of x, y and z coordinates of a surface point can be obtained according to the available definition.

The first laser removing device 11 may be a laser drilling device and it may comprise one or more of the following operating parameters:
laser pulse frequency 0.1 to 100 Hz, preferably 1-30 Hz,
laser pulse duration 0.1 to 20 ms, preferably 0.3 to 2 ms,
pulse peak performance >1 kW, preferably >20 kW,
mean laser performance 300 W-3 kW
energy per pulse 1-100 J, preferably 10-50 J,
laser type: solid-state laser, in particular diode-pumped or lamp-pumped solid-state laser.

The second laser removing device may comprise one or more of the following operating parameters:
laser pulse frequency 1 to 100 kHz, preferably 10-50 kHz,
laser pulse duration 10 to 1500 ns, preferably 100 to 500 ns,
laser performance 10-200 W, preferably 20 to 50 W,
energy per pulse 1-50 mJ,
laser type: quality-switched solid-state laser.

In the laser machining method of the invention the workpiece is machined successively or also alternately by the first and by the second laser removing device without changing the clamping. For this purpose it may be moved between the two operating windows and operating sites, respectively, in particular by the workpiece fixture 10. For example, in one machining step a bore may be made using the laser 15. In a second machining step a more complexly shaped die may be placed by using a different laser 16.

Figure 2:
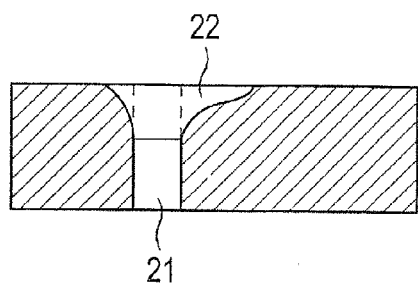
FIG. 2 shows an example of a workpiece to be produced.

FIG. 2 shows a typical product: A workpiece 1 is to be provided with a bore 21 which is to be provided with an unsymmetrical funnel-shaped opening 22 at one side. The production of the bore 21 may be regarded as a first machining step, which may be performed by the first laser removing device 11 through the whole workpiece 1. This has been indicated in dashes in the upper part of FIG. 2. The funnel-shaped widening 22 may then be shaped using the second laser removing device 12.

The laser beam 15 from the first removing device 11 may be used to shape the hole 21. Optionally, the tracking of the laser focusing in correspondence to the advancing depth of the hole may be omitted, however, the laser removing device 11 in particular and parts thereof, respectively, especially the laser beam outlet 11a, may be tracked according to the advancement of the penetration of the laser beam into the workpiece in the z direction. In the case of laser drilling process gas may be supplied as well.

Figure 3:
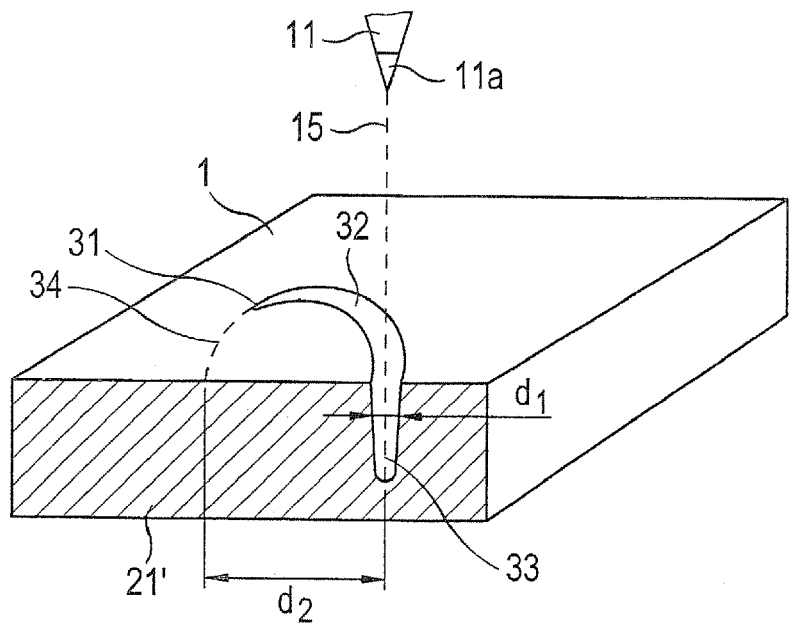
FIG. 3 schematically shows an operating method of the first laser removing device, FIG. 4 schematically shows the operating method of a second laser removing device, and FIG. 5 schematically shows a plan view of the machine.

FIG. 3 shows a possible way of operation for laser drilling which will have to be performed by the first removing device 11 according to the terminology chosen in this description. The laser beam 15 exits from the outlet opening 11a of the laser beam 15 and impinges on the workpiece 1 lying below it. The laser parameters have been chosen such that due to a mixture of liquefaction and vaporization, optionally sublimation and vapor expulsion of melted-on material the laser gradually burns itself into the depth direction of the workpiece. In doing so, it produces a hole having a diameter d1 which may be in the range of some 10 or 100 micrometers and may even achieve up to a few millimeters. Should this bore diameter suffice, the drilling process is completed by the laser beam burning into and through the workpiece once.

However, if a hole having a larger diameter, for example, having a diameter d2, is to be shaped the method may be supplemented by the workpiece 1 and the first laser machining apparatus 11 being moved against each other such that the laser beam 15 slowly travels the outer contour of the desired hole, as suggested by the dashed line 34. In FIG. 3, 31 is to be assumed as the starting point of the path to be taken. 32 marks the channel already cut and the laser beam is just in the cutting plain of the workpiece, keeping wandering around the circumference of the hole until, by following the path 34, it arrives back at the starting point 31. The relative shift between the laser removing device 11 and the workpiece 1 may be performed by slowly adjusting the axes of the workpiece fixture 10 in steps.

Figure 4:
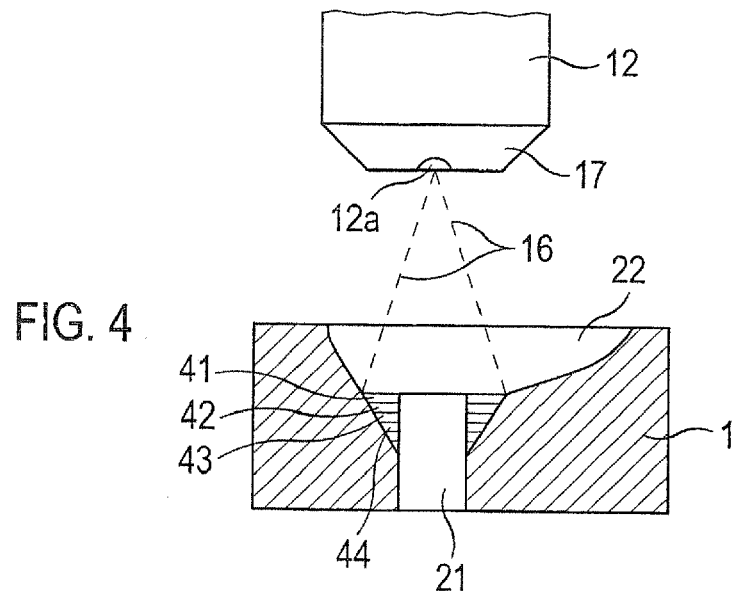

FIG. 4 shows the procedure in case of a die production which according to the terminology of the present description is performed using the second laser removing device 12. Here, material is removed in layers, some layers being indicated by reference numerals 41 to 44. The thicknesses of the layers may be some micrometers up to some 10 micrometers. A single layer is removed by controlling the focus location of the laser beam 16 such that it is suitably positioned in respect of the desired layer, in particular is positioned inside it. Then the laser beam 16 is guided by the variable beam guide 17 across the exposed surface such that at the respective point of impingement the material vaporizes or is removed by vapor expulsion of liquefied material. The second laser removing device 12 and the workpiece 1 may be in a fixed, unchanged spatial relation to each other. Then a single layer is completely travelled by the laser beam, for example meanderingly, and then the next layer is approached by suitably adjusting the focus location and optionally tracking it depending on the respective current x and y coordinates of the point of impingement, for example to balance the calotte of the position of the laser focus. This may partly be performed mechanically, e. g. by the workpiece fixture 10, and/or partly optically by a quickly adjustable and variable optical system ("z shifter"). Thus, individual layers are removed one after another such that in this way the desired complexly shaped die is finally produced. Here, a position-sensitive depth sensor system may be present which measures the advancement at the individual surface points of the die and the depth present there, respectively such that according to the data thus obtained controls may be carried out with reference to stored die data. In particular, the melting spillings adhering from a possible earlier process may thus be detected three-dimensionally, particularly from the start, and then corrected in the further course. The beam guide 17 may comprise deflection mirrors which may be arranged such that they act at right angles towards each other.

As far as a bore as described with reference to FIG. 3 and a die production as described with reference to FIG. 4 are to be performed, it may be preferable to perform the bore first and then to perform the die production because more precise walls can be manufactured by the die production, which will not be deteriorated by attachments resulting from the comparatively coarser drilling process.

As the location of the focal point of the laser beam 16 in the z direction may be of importance for the die production as described with reference to FIG. 4, it may be provided to measure the absolute z location of the surface 1a of the workpiece before the die production according to FIG. 4 is started. Preferably, this is effected as well before the drilling process according to FIG. 3 takes place. Then a surface reference will be clearly known which stays kept during the whole procedure because the method may be carried out without reclamping the workpiece.

Generally, in the case of several different operating steps, it is possible to first perform that having a higher laser performance or a higher energy per pulse and then that having a lower laser performance and a lower energy per pulse, respectively. This may be chosen, for example, if there is fear that a comparatively fine surface produced using a lower laser performance will be destroyed by spillings of a coarser process performed thereafter. However, there may also be applications in which the sequence is just the other way round, i.e. the step having a lower laser performance or less energy per pulse comes first and then that having a higher laser performance and more energy per pulse, respectively. Alternating courses of action are conceivable as well. The drilling can be carried out before or after the production of a finely defined die.

The apparatus as described allows the well adapted laser machining of various machining parts during the production of a workpiece. Thus, it is possible to use the laser machining method not only in the field of prototyping where long machining times are justifiable, but also in the field of series production of high quality workpieces.

We claim:

1. A laser machining apparatus comprising:
a workpiece fixture for fastening a workpiece,
a first laser removing device having a first laser source, a first laser beam and a first laser beam outlet for laser drilling a workpiece using first operating parameters, and
a second laser removing device having a second laser source, a second laser beam and a second laser beam outlet for machining a workpiece using second operating parameters that are different from said first operating parameters,
wherein:
the second laser removing device is configured to remove material of the workpiece in layers,
the first and second laser beam outlets of the first and second laser removing devices are fixedly mounted offset from each other with respect to at least one axis,
the first laser removing device comprises one or more of the following operating parameters:
a pulsed laser light having a laser pulse frequency of 0.1 to 100 Hz;
a laser pulse duration of 0.1 to 20 ms;
a pulse peak performance >1 kW;
a laser performance of 300 W to 3 kW;
an energy per pulse of 1-100 J; and
a laser type comprising one of a diode-pumped solid-state laser or a lamp-pumped solid-state laser;
the second laser removing device comprises one or more of the following operating parameters:
a pulsed laser light having a laser pulse frequency of 1 to 100 kHz;
a laser pulse duration of 10 to 1500 ns;
a laser performance of 10 to 200 W;
an energy per pulse of 1-50 mJ; and
a laser type comprising a quality-switched solid-state laser; and
the workpiece fixture is configured to move the workpiece between operating windows of the first and the second laser removal devices.

2. The laser machining apparatus according to claim 1, wherein at least one of said laser removing devices comprises a beam guide.

3. The laser machining apparatus according to claim 1, wherein at least one of the first and second laser beam outlets is movable with respect to at least one axis.

4. The laser machining apparatus according to claim 3, wherein said first laser removing device comprises a first laser source and said second laser removing device comprises a second laser source, and further wherein at least one of the first and second laser sources is movable in parallel and in sync with the at least one of the first and second laser beam outlets.

5. The laser machining apparatus according to claim 1, further comprising a first control for controlling the first laser removing device and a second control for controlling the second laser removing device.

6. The laser machining apparatus according to claim 5, wherein the second control operates at a higher clock frequency than the first control.

7. The laser machining apparatus according to claims 5 or 6, further comprising an interface communicating between the first and second controls.

8. The laser machining apparatus according to claim 1, wherein the first laser removing device comprises a first optical system and the second laser removing device comprises a second optical system.

9. The laser machining apparatus according to claim 1, wherein the first laser removing device comprises a first sensor system and the second laser removing device comprises a second sensor system.

10. The laser machining apparatus according to claim 1, wherein the first and second laser beam outlets of the first and second laser removing devices are fixedly mounted offset from each other with respect to two axes.

11. The laser machining apparatus according to claim 1, wherein the first laser moving device comprises a pulsed laser light having a laser pulse frequency of 1 to 30 Hz.

12. The laser machining apparatus according to claim 1, wherein the first laser moving device has a laser pulse duration of 0.3 to 2 ms.

13. The laser machining apparatus according to claim 1, wherein the first laser moving device has a pulse peak performance greater than 20 kW.

14. The laser machining apparatus according to claim 1, wherein the first laser moving device has an energy per pulse of 10 to 50 J.

15. The laser machining apparatus according to claim 1, wherein the second laser moving device comprises a pulsed laser light having a laser pulse frequency of 10 to 50 kHz.

16. The laser machining apparatus according to claim 1, wherein the second laser moving device has a laser pulse duration of 100 to 500 ns.

17. The laser machining apparatus according to claim 1, wherein the second laser moving device has a laser performance of 20 to 50 W.

18. A laser machining method wherein a workpiece is clamped and then machined using laser light, wherein a first machining step of laser drilling the workpiece is performed through a first laser removing device having a first laser beam and a first laser outlet and using first operating parameters and a second machining step is performed through a second laser removing device having a second laser beam and a second laser outlet to machine the workpiece using second operating parameters different from the first operating parameters, wherein:

the second machining step comprises removing material of the workpiece in layers using the second laser beam, the first and second laser beams of the first and second laser removal devices are radiated at the first and second laser beam outlets which are fixedly mounted offset from each other with respect to at least one axis, and the workpiece is moved without changing the clamping between operating windows of the first and the second laser removal devices.

19. The method according to claim 18, wherein a measurement of the distance necessary for the second machining step is performed before the first machining step is taken.

20. The method according to claims 18 or 19, wherein during the first machining step using the first laser removing device a focusing of the first laser beam is fixed whereas during the second machining step using the second laser removing device a focusing of the second laser beam is tracked.

21. The method according to claims 18 or 19, wherein during the first machining step using the first laser removing device process gas is supplied.

22. The method according to claim 20, wherein during the first machining step using the first laser removing device process gas is supplied.

23. The method according to claim 18, wherein during the second machining step using the second laser removing device the location of the second laser beam is guided by a variable beam guide.

24. The method according to claim 18, wherein during the first machining step using the first laser removing device the relative position of the location of the first laser removing device to the workpiece is changed.

25. The method according to claim 18, wherein first the machining step having a higher laser performance is taken and then the machining step having a lower laser performance is taken.

26. A method according to claim 18, wherein the first and second laser beams of the first and second laser removal devices are radiated at the first and second laser beam outlets which are fixedly mounted offset from each other with respect to two axes.

\* \* \* \* \*

UNITED STATES PATENT AND TRADEMARK OFFICE
CERTIFICATE OF CORRECTION

| | |
|---|---|
| PATENT NO. | : 7,902,483 B2 |
| APPLICATION NO. | : 10/595733 |
| DATED | : March 8, 2011 |
| INVENTOR(S) | : Alfons Eiterer |

Page 1 of 1

It is certified that error appears in the above-identified patent and that said Letters Patent is hereby corrected as shown below:

In claim 11, column 7, line 17, change "first laser moving device" to --first laser removing device--.

In claim 12, column 7, line 20, change "first laser moving device" to --first laser removing device--.

In claim 13, column 7, line 23, change "first laser moving device" to --first laser removing device--.

In claim 14, column 7, line 26, change "first laser moving device" to --first laser removing device--.

In claim 15, column 7, line 29, change "second laser moving device" to --second laser removing device--.

In claim 16, column 7, line 32, change "second laser moving device" to --second laser removing device--.

In claim 17, column 7, line 35, change "second laser moving device" to --second laser removing device--.

Signed and Sealed this
Thirty-first Day of May, 2011

David J. Kappos
*Director of the United States Patent and Trademark Office*